(12) United States Patent
Buragohain et al.

(10) Patent No.: US 8,886,609 B2
(45) Date of Patent: Nov. 11, 2014

(54) BACKUP AND RESTORE OF DATA FROM ANY CLUSTER NODE

(75) Inventors: Joydeep Buragohain, Issaquah, WA (US); Andrea D'Amato, Kirkland, WA (US); Vinod R. Shankar, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 520 days.

(21) Appl. No.: 12/971,981

(22) Filed: Dec. 17, 2010

(65) Prior Publication Data

US 2012/0158662 A1 Jun. 21, 2012

(51) Int. Cl.
*G06F 17/30* (2006.01)
*G06F 11/14* (2006.01)
*H04L 29/08* (2006.01)
*H04L 29/14* (2006.01)

(52) U.S. Cl.
CPC ........ *G06F 11/1461* (2013.01); *G06F 11/1464* (2013.01); *G06F 2201/84* (2013.01); *G06F 2201/82* (2013.01); *H04L 67/28* (2013.01); *H04L 69/40* (2013.01); *H04L 67/1097* (2013.01)
USPC ........................................................ 707/649

(58) Field of Classification Search
USPC ........................................................ 707/649
See application file for complete search history.

(56) References Cited

U.S. PATENT DOCUMENTS

| | | | |
|---|---|---|---|
| 6,950,833 B2 | 9/2005 | Costello et al. | |
| 7,441,092 B2 | 10/2008 | Lyon | |
| 7,587,565 B1 * | 9/2009 | Bingham et al. | 711/162 |
| 2004/0139125 A1 | 7/2004 | Strassburg et al. | |
| 2004/0220981 A1 | 11/2004 | Taylor | |
| 2005/0050115 A1 * | 3/2005 | Kekre | 707/204 |
| 2007/0043969 A1 | 2/2007 | Schneider | |
| 2008/0022042 A1 * | 1/2008 | Satoyama et al. | 711/114 |
| 2009/0300080 A1 * | 12/2009 | Stringham | 707/204 |
| 2009/0327798 A1 | 12/2009 | D'Amato et al. | |

OTHER PUBLICATIONS

Lu, Yingping, and David HC Du. "Performance study of iSCSI-based storage subsystems." Communications Magazine, IEEE 41.8 (2003): 76-82.*

Repantis, Thomas, et al. "Scaling a monitoring infrastructure for the Akamai network." ACM SIGOPS Operating Systems Review 44.3 (2010): 20-26.*

(Continued)

*Primary Examiner* — Usmaan Saeed
*Assistant Examiner* — Nan Hutton
(74) *Attorney, Agent, or Firm* — Henry Gabryjelski; David Andrews; Micky Minhas

(57) ABSTRACT

Implementing point in time back-up. A method that may be practiced in a distributed computing environment. The distributed computing environment includes a number of computing system nodes. The method includes at a first node in the computing environment, taking a snapshot of a cluster volume. The cluster volume stores data items (e.g. files/blocks). Taking a snapshot includes marking a point in time for data items in the volume. The method further includes receiving a notification that a different node in the computing environment than the first node, has determined to change a data item in the cluster volume at a point after the marked point in time from an old version of the data item to a new version of the data item. The method further includes at the first node, saving the old version of the data item prior to modification.

17 Claims, 2 Drawing Sheets

(56) References Cited

OTHER PUBLICATIONS

Adeshiyan, T., et al. "Using virtualization for high availability and disaster recovery." IBM Journal of Research and Development 53.4 (2009): 8-1.*

Microsoft TechNet—"Event ID 1584—Cluster Shared Volume Backup," Nov. 25, 2009, http://technet.microsoft.com/en-us/library/ee830301(WS.10).aspx.

Wesselius, J., "Exchange backups on Windows Server 2008," Aug. 24, 2009, http://www.simple-talk.com/content/print.aspx?article=786.

IBM Tivoli, "Using VSS operations in a cluster," Sep. 29, 2010, http://publib.boulder.ibm.com/infocenter/tsminfo/v6/index.jsp?topic=/com.ibm.itsm.mail.exc.doc/dpe_con_vss_cluster.html.

* cited by examiner

BACKUP AND RESTORE OF DATA FROM ANY CLUSTER NODE

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems, to quickly and efficiently receive application data from other computing system, and for computing systems to otherwise collaborate in performing computing tasks.

In some environments, a group of nodes (e.g. servers) are arranged in a cluster. Within a cluster, if any node fails, other nodes of the cluster can transparently take over the work of the failed node. The other nodes can restart applications and thereby continue serving clients without significant interruption. This operation is generally referred to as failover, or failover clustering.

Failover clustering often implements a "shared-nothing" storage model. That is, each storage unit (e.g., a disk or part thereof) is owned by a single node. Only that node can perform direct input/output (I/O) to that specific storage unit. A storage unit can be referred to by a Logical Unit Number ("LUN"), which exposes one or more volumes.

In this model, application and disk resources are part of a common group (a unit of failover corresponding to a LUN) with an explicit dependency between the application-resource and the disk-resource. This provides some guarantee that disks are brought online before an application starts, and are put offline after the application exits. As a result, clustered applications are constrained to this I/O model, whereby any of the applications that need access to the same disk need to be run on the same cluster node.

In a distributed environment the nodes have access to shared data storage usually referred as a L UN, as described above. A data container is a logical allocation on the data storage usually referred to as a volume. In the case of a cluster, they are referred to as cluster volume. A data container could in turn mount a file system like NTFS or FAT where individual files can be stored and managed as a logical unit. Files may be one type of a data items as referred to herein. Similarly blocks within a volume/disk could are another type of data item in a data container.

Some clustering technologies like Cluster Shared Volumes (CSV), a technology available from Microsoft Corporation of Redmond, Wash., coordinate between nodes to provide a non-owner node with direct I/O access to the data storage device via proxy cluster volumes.

One of the nodes in the cluster owns the cluster volume. Clustering exposes a proxy cluster volume on all the nodes to allow access to the cluster volume. Cluster volume ensures data consistency so nodes could independently access and modify data. Using a proxy cluster volume an application can perform I/O directly to the data storage, in the present example, the LUN.

Prior solutions implementing backup operations of cluster volumes were such that a user designated a node performing backup operations as the owner node for the cluster volume that was being backed up. The cluster volume would be mounted at the owner node and other nodes would rely on the owner node to perform operations on the cluster storage. Inasmuch as a cluster volume can have only one owner at a time, this forced backup of user data on cluster volumes to be serialized, meaning that only a single node could create a backup at any given time by sending the updates to the owner node. For data consistency during backup, all I/O was forwarded to the owner node, resulting in heightened network traffic causing significantly degraded IO performance.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a distributed computing environment. The distributed computing environment includes a number of computing system nodes. The method includes acts for implementing point in time back-up. The method includes, at a first node in the computing environment, taking a snapshot of a cluster volume via a proxy cluster volume. The cluster volume stores files. Taking a snapshot includes marking a point in time in the cluster volume. The method further includes receiving a notification that a different node in the computing environment than the first node, has determined to change a data item in the cluster volume at a point after the marked point in time from an old version of the data item to a new version of the data item. The method further includes at the first node, saving the old version of the data item.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein implement a plug-in, sometimes referred to herein as a snapshot provider, with a system backup infrastructure that can be used by any node in a cluster to back-up a volume. While there remains an owner node having the cluster volume mounted at the owner node. A proxy cluster volume is exposed to represent cluster volume on all the nodes. Nodes access a cluster volume through a proxy cluster volume and backup may be initiated against the proxy cluster volume. The nodes that do not have the cluster volume mounted to them can nonetheless perform backup functions. The snapshot provider and the backup infrastructure can be used to create a point-in-time image, such as a snapshot of a cluster volume from any cluster node. The actual snapshot may be created on a different node (such as the owner node) than the node creating the snapshot. Embodiments may be implemented to ensure that the actual snapshot is time consistent regardless of which nodes are modifying the contents of the cluster volume.

Embodiments may be implemented to facilitate transparency to the user in terms of taking a backup. For example, a legacy backup application that does not know anything about proxy cluster volumes may be able to back up data hosted on such a volume. A point-in-time image of the proxy cluster volume may be transparently maintained by coordinating with the real snapshot on cluster volume which could be located on a different cluster node.

Figure 1:
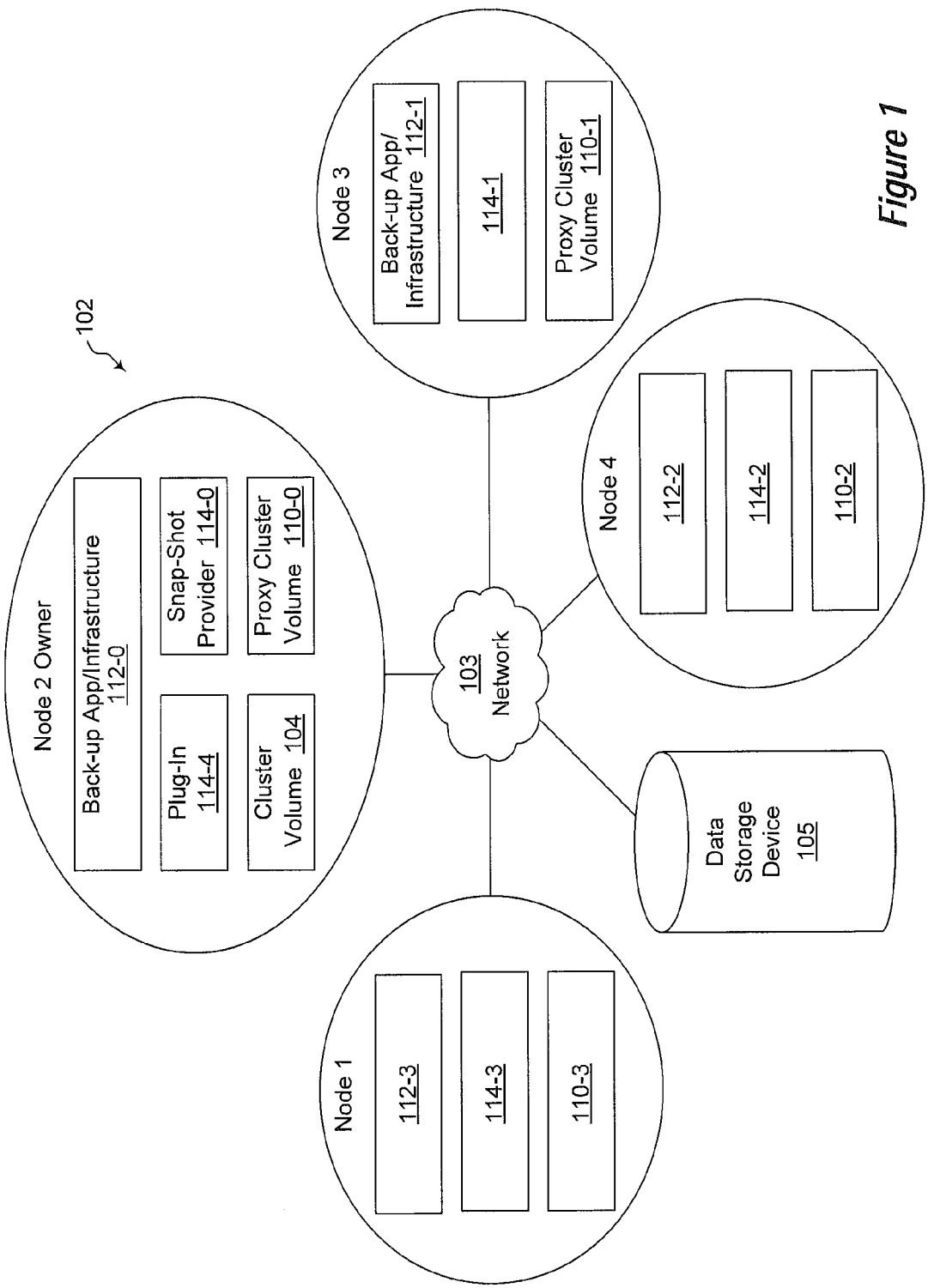
FIG. 1 illustrates an example computing cluster with backup and restore functionality.
Figure 2:
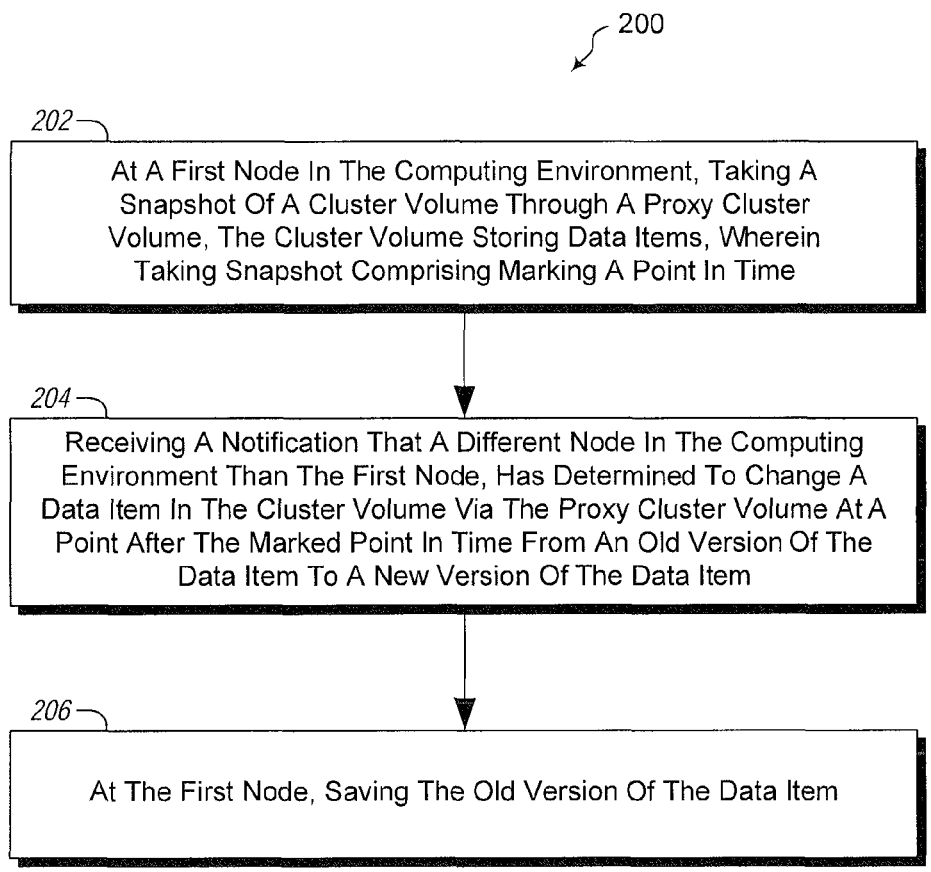
FIG. 2 illustrates a method of implementing point in time backup for a distributed computing system.

Referring now to FIG. 1, a basic example is illustrated. In the example shown in FIG. 1, a cluster 102 is illustrated. The cluster 102 includes a plurality of nodes, node 1, node 2, node 3, and node 4 connected through a network 103. Node 2 includes an underlying cluster volume 104. The underlying cluster volume 104 may be, for example, a file system, such as a FAT32 or NTFS file system. A file system may be related to an underlying data storage device. In the example illustrated in FIG. 1, the underlying cluster volume 104 may connect to a data storage device 105, which may be the underlying data storage device for the cluster volume 104. The data storage device 105 may be for example a NAS (network attached storage), SAN (storage area network), etc. In the example illustrated herein, the cluster volume 104 is part of the data storage device 105. The cluster volume is exposed on owner node, such as node 2. The owner node is the node to which the cluster volume is mounted, in this example, node 2 using the underlying data container 104. The cluster volume is exposed on all cluster nodes in the cluster 102 through a proxy cluster volume, referred to generally as 110 but illustrated specifically as 110-0, 110-1, 110-2, and 110-3 for nodes n2, n3, n4 and n1 respectively, existing at each node in the cluster 102. While embodiments may allow other nodes to access the cluster volume by sending I/O to the owner node, node 2, examples illustrated herein allow each of the nodes (n3, n4, n2 and n1) to directly perform I/O operations on the data storage device 105 through proxy cluster volume 110.

Each of the cluster nodes include an infrastructure, referred to generally as 112, but shown on each node as 112-0, 112-1, 112-2, and 112-3 for nodes n2, n3, n4 and n1 respectively, for backing up or taking snapshots of the underlying data container 104 also referred as the cluster volume. In the example illustrated, the backup application and/or infrastructure 112 may only be intended to for use with locally mounted volumes. In this example, the underlying cluster volume 104 and the data storage device 105 appear as a locally mounted volume to the backup application and/or infrastructure 112-0. Backup may be performed by creating snapshot images of a volume. Snapshot images may be implemented via a copy-on-write algorithm. This means that when an original snapshot image is created, the underlying storage for the snapshot image and the cluster volume are the same. When a data item in the cluster volume is to be changed, the older version of the data item is saved at node 2 by the infrastructure 112-0. This way, a snapshot can present a point-in-time image of the cluster volume without making a full copy of the volume.

Illustrating now participation of nodes in using the data storage device 105 and having functionality for performing backup operations on the proxy cluster volume, attention is now directed to node 3. Node 3 includes a proxy cluster volume 110-1. The proxy cluster volume 110-1 allows node 3 to directly access the data storage device 105. The proxy cluster volume 110-1 is a proxy volume representing the cluster volume mounted in node 2. Similarly, all nodes in the cluster 102 are able to access the cluster volume through an instance of the proxy cluster volume 110 (i.e. 110-0, 110-2 and 110-3) present at those nodes.

A specific example is now illustrated with respect to Node 3, but it should be appreciated that similar actions may be taken by any of the other nodes in the cluster 102, including the owner node Node 2, which includes a proxy cluster volume 110-0 and a snapshot provider 114-0. Node 3 may include backup applications and/or infrastructure 112-1. The backup applications and/or infrastructure 112-1 may be configured to work with a local data container, such as a local file system or local volume, and may not be configured to work with shared file systems. Thus, node 3 includes a snapshot provider 114-1 which can be used as an interface between the backup applications and/or infrastructure 112-1 to cause a shared file system to be able to be used with the backup applications and/or infrastructure 112-1. The snapshot provider 114-1 has two components, a front end and a back end. The front-end (which can be called the proxy snapshot provider) is the entry point for the back-up application and/or infrastructure 112-1 to call into, and the back-end is a service (part of the cluster infrastructure) that runs in node 2, which is the owner of the cluster volume by virtue of the fact that it is the node where the cluster volume is mounted. The back-up application and/or infrastructure 112-1 at node 3 interacts with the front-end only and may be oblivious to the back-end.

The snapshot provider 114-1 notifies the back-up application and/or infrastructure 112-1 that it can create snapshot images and manage their lifecycle for proxy cluster volumes. Thus, the back-up application and/or infrastructure 112-1 will call the proxy snapshot provider 114-1 to perform backup operations. The snapshot provider 114-1 front-end relays calls to the back-end on the owner node, node 2 where the real snapshot image gets created and its life-cycle managed on the cluster volume. The back-end uses the infrastructure 112-0 on the owner node to create the real snapshot image. For example, a request for a backup from back-up application and/or infrastructure 112-1 at node 3 is routed to the proxy snapshot provider 114-1, which causes a message to be sent to the backend at node 2. At node 2, the infrastructure 112-0 is used to set a snapshot point-in-time on the cluster volume, which will cause subsequent changes to the data in the cluster volume 104 to be saved.

Once a snapshot gets created on the cluster volume, modifications to that volume via the proxy cluster volume/proxy volume from any node will trigger a notification to the owner node, node 2, to carry out any necessary copy-on-write on the real snapshot image associated with the cluster volume. Each cluster node maintains its own view of the "copy-on-write" state on the proxy cluster volume on behalf of the cluster volume. Using this state, a cluster node minimizes the number of copy-on-write requests to the owner node. Inasmuch as the owner node carries out the real copy-on-write, correctness is maintained even if different nodes send duplicate or overlapping requests.

For example, if node 3 seeks to add or change data in the cluster volume 104, it will send the data to the storage device 105 through the proxy cluster volume 110-1. Additionally, proxy cluster volume 110-1 on node 3 will trap any modifications to the data items stored in the cluster volume 104 and notify node 2 through the cluster infrastructure that something is about to be changed in the cluster volume 104, which will cause the infrastructure 112-0 to save the old data.

Some embodiments may be implemented using the Volume Shadow Copy (VSS) infrastructure available from Microsoft® Corporation of Redmond Wash. An example is now illustrated. VSS is the Windows component that provides the backup and restore infrastructure. Backup products use the VSS infrastructure to provide users with backup and restore functionality. A proxy cluster volume 110 is a volume that is exposed by a cluster on every node with an identical access point (i.e. having the same namespace). A proxy cluster volume can support simultaneous or near simultaneous read/write operations from all cluster nodes. A proxy snapshot provider is a pluggable module in the VSS infrastructure that assumes the responsibility of creating snapshot (point-in-time) images of a proxy cluster volume. In the example illustrated, proxy snapshot provider is the snapshot provider 114-0. A system provider is a pluggable module to create snapshot images in the VSS infrastructure. In the example illustrated, the plug-in 114-4 may be a system provider. A cluster service provides the Windows clustering functionality. In the illustrated embodiment, it runs on every cluster node. A file system can mount on a proxy volume and expose file semantics for applications to use. This also runs on every cluster node in the illustrated embodiment.

Ordinarily, the VSS infrastructure has a single node view. It can only work with local volumes (not network shares) and also assumes that a volume is accessed from that one node only. However, some embodiments described herein may, in spite of the distributed nature of storage, present a single node view to the VSS infrastructure and hide the distributed nature of the proxy cluster volumes from VSS. The distributed nature means that I/O to a cluster volume is possible from any cluster node at any time.

Embodiments may include a provider to plug into the VSS framework of a cluster node. The provider has two components, a front end and a back end. The front-end is the entry point for VSS infrastructure to call into, and the back-end is a service that runs in the cluster node that is the "owner" of the cluster volume. The VSS infrastructure interacts with the front-end only and is oblivious of the back-end.

Inasmuch as the provider notifies VSS that it can create snapshot images and manage their lifecycle for proxy cluster volumes, the VSS infrastructure will call the provider. The provider front-end relays all the calls to the back-end on the "owner" node where the real snapshot image gets created and its life-cycle managed on the cluster volume. The back-end uses the VSS system provider on the owner node to create the real snapshot image on the cluster volume.

Snapshot images created via the system provider are implemented via a copy-on-write algorithm. This means that when the snapshot image is created, the underlying file storage for the snapshot image and the original volume are the same. When a file gets changed in the original volume, the older version of the data is copied into the snapshot image. This way, a snapshot can present a point-in-time image of a volume without making a full copy of the original volume. Again, this implementation supports a local volume only.

Once a snapshot gets created on a cluster volume exposed through proxy cluster volume, modifications to that volume from any node will trigger a notification to the "owner" node to carry out any necessary copy-on-write on the real snapshot image associated with the cluster volume. Each proxy cluster volume maintains its own view of the "copy-on-write" state of a cluster volume. Using this state, a cluster node minimizes the number of copy-on-write requests to the "owner" node. Inasmuch as the owner node carries out the real copy-on-write, correctness is maintained even if different nodes send duplicate or overlapping requests.

The snapshot image exposed to a backup application is also fault-tolerant. This means that if the cluster volume and/or the associated snapshot image in the owner node goes offline and then comes back online (either on the original node or a different node), the snapshot image exposed to the backup application will remain alive and accessible all throughout.

Embodiments may also allow a snapshot image to be accessible from any number of nodes in the cluster. For example, if a backup application needs the snapshot image to be exposed on all or a subset of cluster nodes, it is possible to do so regardless of which node is the "owner" of the real snapshot image.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

One embodiment illustrated herein includes a method 200 that may be practiced in a distributed computing environment. The distributed computing environment includes a number of computing system nodes. The method includes acts for implementing point in time back-up. The method includes at a first node in the computing environment, taking a snapshot of a proxy cluster volume (act 202). The proxy cluster volume stores data items (e.g. files/blocks). Taking snapshot includes marking a point in time for data items in the backing cluster volume. The method further includes receiving a notification that a different node in the computing environment than the first node, has determined to change a data item in the cluster volume through proxy cluster volume at a point after the marked point in time from an old version of the data item to a new version of the data item (act 204). The method further includes at the first node, storing the old version of the data item (act 206).

The method 200 may be practiced where the first node is an owner node having the cluster volume mounted at the first node. For example, as illustrated in FIG. 1, node 2 which has the cluster volume 104 mounted to it may be an example of the first node.

The method 200 may be practiced where receiving a notification that a different node in the computing environment than the first node, has determined to change a data item in the cluster volume through proxy cluster volume. The proxy cluster volume serves as an interface between an applications or infrastructure at the different node and a cluster volume on the owning node.

In some embodiments, the plug-in is configured to implement transparency for back-up applications or infrastructure that do not natively have clustering functionality by appearing to the back-up applications or infrastructure as local storage. For example, the snapshot provider 114-1 allows the proxy cluster volume 110-1 in node 3 to appear to the back-up application as a local storage. This may be especially useful in embodiments where the back-up application and/or infrastructure 112 do not natively support proxy cluster volume.

The plug-in may include a front end and a back end. The front-end may be an entry point for a back-up application or infrastructure to call into and the back-end may be a service that runs in the proxy cluster volume owner node. For example, in FIG. 1, the front end of the snapshot provider 114-1 may be an entry point in node 3, while the back-end includes a service running in node 2. The back-end may use an infrastructure native to the owner node to save the old version of the data item. In the example illustrated in FIG. 1, the back-end may use the infrastructure 112-0, which can readily access the data storage device 105 through the underlying proxy cluster volume 104.

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a distributed computing environment comprising a plurality of computing system nodes, a method of implementing point in time back-up, the method comprising:

at a first node in the computing environment, wherein the computing environment comprises a plurality of nodes, each of the nodes being able to communicate with a cluster volume mounted at one of the nodes, but not mounted at the other nodes, the nodes able to communicate with the cluster volume using a proxy cluster volume which allows the nodes to modify data items in the cluster volume without needing to request modification from the node on which the cluster volume is mounted, taking a snapshot of the cluster volume through the proxy cluster volume and a backup application or infrastructure at the first node, the backup application or infrastructure configured to perform backup operations on volumes locally mounted at the first node, the cluster volume storing data items, wherein taking snapshot comprises marking a point in time, wherein the first node is an owner node and thus has the cluster volume mounted to it, such that the first node is able to use the backup application or infrastructure configured to perform backup operations of volumes locally mounted, to directly take the snapshot rather than needing to cause a different system to perform the snapshot;

receiving, at the first node, a notification, through the proxy cluster volume, that a different node in the computing environment than the first node, has determined to change a data item in the cluster volume via the proxy cluster volume, rather than requesting that a data item be changed by the first node, and that the data item is about to be changed, at a point after the marked point in time from an old version of the data item to a new version of the data item; and as a result of receiving, at the first node, a notification, through the proxy cluster volume, that a different node in the computing environment than the first node, has determined to change a data item in the cluster volume via the proxy cluster volume, rather than requesting that a data item be changed by the first node, and that the data item is about to be changed, at the first node, saving the old version of the data item to create a snapshot image via a copy-on-write algorithm to present a point-in-time image of the cluster volume without making a full copy of the volume, such that the copy-on-write algorithm is performed by the first node, even though the different node than the first node in the computing environment has determined to change a data item in the cluster volume.

2. The method of claim 1, wherein receiving a notification that a different node in the computing environment than the first node, has determined to change a data item in the cluster volume comprises receiving a notification from the proxy cluster volume at the different node, the proxy cluster volume serving as an interface between an application and the cluster volume to allow the application to write directly to the cluster volume even though the cluster volume is not mounted to the different node.

3. The method of claim 1, wherein a plug-in at one or more of the nodes is configured to implement transparency for back-up applications or infrastructure that do not natively have clustering functionality in that the backup applications or infrastructure perform backup operations of volumes locally mounted by appearing to the back-up applications or infrastructure as local storage.

4. The method of claim 3, wherein the plug-in comprises a front end and a back end, wherein the front-end is an entry point for a back-up application or infrastructure to call into locally at a given node and the back-end is a service that runs in the first node so as to provide backup functionality to nodes not having the cluster volume locally mounted to them.

5. The method of claim 4, wherein the back-end uses the infrastructure native to the first node to save the old version of the data item.

6. The method of claim 1, wherein at a first node in the computing environment, taking a snapshot of a cluster volume is performed in response to a backup application or infrastructure at another node indicating that a snapshot should be taken on the proxy cluster volume, and a message being sent from the another node to the first node to indicate that the first node should take a snapshot of the cluster volume.

7. A computer readable physical storage media comprising computer executable instructions that when executed by one or more processors causes the following to be performed:

at a first node in the computing environment, wherein the computing environment comprises a plurality of nodes, each of the nodes being able to communicate with a cluster volume mounted at one of the nodes, but not mounted at the other nodes, the nodes able to communicate with the cluster volume using a proxy cluster volume which allows the nodes to modify data items in the cluster volume without needing to request modification from the node on which the cluster volume is mounted, taking a snapshot of the cluster volume through the proxy cluster volume and a backup application or infrastructure at the first node, the backup application or infrastructure configured to perform backup operations on volumes locally mounted at the first node, the cluster volume storing data items, wherein taking snapshot comprises marking a point in time, wherein the first node is an owner node and thus has the cluster volume mounted to it, such that the first node is able to use the backup application or infrastructure configured to perform backup operations of volumes locally mounted, to directly take the snapshot rather than needing to cause a different system to perform the snapshot;

receiving, at the first node, a notification, through the proxy cluster volume, that a different node in the computing environment than the first node, has determined to change a data item in the cluster volume via the proxy cluster volume, rather than requesting that a data item be changed by the first node, and that the data item is about to be changed, at a point after the marked point in time from an old version of the data item to a new version of the data item; and as a result of receiving, at the first node, a notification, through the proxy cluster volume, that a different node in the computing environment than the first node, has determined to change a data item in the cluster volume via the proxy cluster volume, rather than requesting that a data item be changed by the first node, and that the data item is about to be changed, at the first node, saving the old version of the data item to create a snapshot image via a copy-on-write algorithm to present a point-in-time image of the cluster volume without making a full copy of the volume, such that the copy-on-write algorithm is performed by the first node, even though the different node than the first node in the computing environment has determined to change a data item in the cluster volume.

8. The computer readable memory of claim 7, wherein receiving a notification that a different node in the computing environment than the first node, has determined to change a data item in the cluster volume comprises receiving a notification from the proxy cluster volume at the different node, the proxy cluster volume serving as an interface between an application and the cluster volume to allow the application to write directly to the cluster volume even though the cluster volume is not mounted to the different node.

9. The computer readable memory of claim 7, wherein a plug-in at one or more of the nodes is configured to implement transparency for back-up applications or infrastructure that do not natively have clustering functionality in that the backup applications or infrastructure perform backup operations of volumes locally mounted by appearing to the back-up applications or infrastructure as local storage.

10. The computer readable memory of claim 9, wherein the plug-in comprises a front end and a back end, wherein the front-end is an entry point for a back-up application or infrastructure to call into locally at a given node and the back-end is a service that runs in the first node so as to provide backup functionality to nodes not having the cluster volume locally mounted to them.

11. The computer readable memory of claim 10, wherein the back-end uses a infrastructure native to the first node to save the old version of the data item.

12. The computer readable memory of claim 7, wherein at a first node in the computing environment, taking a snapshot of a cluster volume is performed in response to a backup application or infrastructure at another node indicating that a snapshot should be taken on the proxy cluster volume, and a message being sent from the another node to the first node to indicate that the first node should take a snapshot of the cluster volume.

13. In a computing environment, a computing system for implementing point in time back-up, the computing system comprising:
  one or more processors;
  one or more computer readable media coupled to the one or more processors, the one or more computer readable comprising computer executable instructions that when executed by a processor cause the following to be performed:
    at a first node in the computing environment, wherein the computing environment comprises a plurality of nodes, each of the nodes being able to communicate with a cluster volume mounted at one of the nodes, but not mounted at the other nodes, the nodes able to communicate with the cluster volume using a proxy cluster volume which allows the nodes to modify data items in the cluster volume without needing to request modification from the node on which the cluster volume is mounted, taking a snapshot of the cluster volume through the proxy cluster volume and a backup application or infrastructure at the first node, the backup application or infrastructure configured to perform backup operations on volumes locally mounted at the first node, the cluster volume storing data items, wherein taking snapshot comprises marking a point in time, wherein the first node is an owner node and thus has the cluster volume mounted to it, such that the first node is able to use the backup application or infrastructure configured to perform backup operations of volumes locally mounted, to directly take the snapshot rather than needing to cause a different system to perform the snapshot;
    receiving, at the first node, a notification, through the proxy cluster volume, that a different node in the computing environment than the first node, has determined to change a data item in the cluster volume via the proxy cluster volume, rather than requesting that a data item be changed by the first node, and that the data item is about to be changed, at a point after the marked point in time from an old version of the data item to a new version of the data item; and
    as a result of receiving, at the first node, a notification, through the proxy cluster volume, that a different node in the computing environment than the first node, has determined to change a data item in the cluster volume via the proxy cluster volume, rather than requesting that a data item be changed by the first node, and that the data item is about to be changed, at the first node, saving the old version of the data item to create a snapshot image via a copy-on-write algorithm to present a point-in-time image of the cluster volume without making a full copy of the volume, such that the copy-on-write algorithm is performed by the first node, even though the different node than the first node in the computing environment has determined to change a data item in the cluster volume.

14. The computing system of claim 13, wherein receiving a notification that a different node in the computing environment than the first node, has determined to change a data item in the cluster volume comprises receiving a notification from the proxy cluster volume at the different node, the proxy cluster volume serving as an interface between an application and the cluster volume to allow the application to write directly to the cluster volume even though the cluster volume is not mounted to the different node.

15. The computing system of claim 13, wherein a plug-in at one or more of the nodes is configured to implement transparency for back-up applications or infrastructure that do not natively have clustering functionality in that the backup applications or infrastructure perform backup operations of volumes locally mounted by appearing to the back-up applications or infrastructure as local storage.

16. The computing system of claim 15, wherein the plug-in comprises a front end and a back end, wherein the front-end is an entry point for a back-up application or infrastructure to call into locally at a given node and the back-end is a service that runs in the first node so as to provide backup functionality to nodes not having the cluster volume locally mounted to them.

17. The computing system of claim 16, wherein the back-end uses a back-up application or infrastructure native to the first node to save the old version of the data item prior to modifying it.

* * * * *